US007249095B2

(12) United States Patent
Davies et al.

(10) Patent No.: US 7,249,095 B2
(45) Date of Patent: Jul. 24, 2007

(54) SYSTEM AND METHOD FOR EXECUTING DEPOSIT TRANSACTIONS OVER THE INTERNET

(75) Inventors: Anthony Davies, Bridgend (GB); Dave Lally, Enfield (GB); Coleman Chang, Hong Kong (HK); Teri Resca, North Bellmore, NY (US); Eric Hirschhorn, Paramus, NJ (US); Eileen Moy, Manhasset, NY (US)

(73) Assignee: The Chase Manhattan Bank, N.A., New York, NY (US)

( * ) Notice: Subject to any disclaimer, the term of this patent is extended or adjusted under 35 U.S.C. 154(b) by 1466 days.

(21) Appl. No.: 09/876,762

(22) Filed: Jun. 7, 2001

(65) Prior Publication Data

US 2002/0059141 A1 May 16, 2002

Related U.S. Application Data

(60) Provisional application No. 60/209,937, filed on Jun. 7, 2000.

(51) Int. Cl.
*G06Q 40/00* (2006.01)
(52) U.S. Cl. .............................. 705/39; 705/35; 705/38; 705/42
(58) Field of Classification Search .................. 705/39, 705/35, 38, 42
See application file for complete search history.

(56) References Cited

U.S. PATENT DOCUMENTS 5,691,524 A * 11/1997 Josephson .................... 705/40
5,783,808 A * 7/1998 Josephson .................... 235/379
6,088,686 A * 7/2000 Walker et al. ................. 705/38
2005/0021466 A1* 1/2005 Buchanan et al. ............ 705/42

OTHER PUBLICATIONS

DraftWorldwide Adds 3 Dot-Coms, iMarketing News, v 2, n 18, p. 18, May 8, 2000.*

* cited by examiner

*Primary Examiner*—Jagdish Patel
(74) *Attorney, Agent, or Firm*—Hunton & Williams LLP

(57) ABSTRACT

A system and method for initiating and processing banking deposits. In a preferred embodiment, the system is maintained by a financial institution such as a bank and the bank customers access the system through the Internet. A typical bank customer is a corporate treasurer. The system provides a Graphical User Interface that allows the customers to view the bank's current rates for a plurality of currencies and a plurality of time periods. The time periods for the deposits typically range from overnight to several months. Once the customer has found a time period/rate/currency that is acceptable, the customer selects the desired rate on the customer interface and the system automatically generates a deal ticket that is presented to the customer. The customer can then modify the settlement date, the settlement instructions and the amount of the deposit. Once the customer is satisfied with the deal, the customer submits it for trading. In an important aspect of the present invention, the confirmation of the trade occurs online and real time. Once the customer accepts the deal, it is logged. The system has further utilities for the customers to view archives of previous deals, establish profiles and preferences and chat with bank representatives. The system further includes state of the art security in order to ensure the safety and confidentiality of the banking transactions.

51 Claims, 4 Drawing Sheets

SYSTEM AND METHOD FOR EXECUTING DEPOSIT TRANSACTIONS OVER THE INTERNET

CROSS REFERENCE TO RELATED APPLICATIONS

This application is based on U.S. Provisional Patent Application No. 60/209,937, filed on Jun. 7, 2000, entitled INTERNET TRADING SYSTEM FOR DEPOSITS.

FIELD OF THE INVENTION

The present invention generally relates to systems and methods for executing banking transactions, and more particularly to systems and methods for executing deposit trades over the Internet.

BACKGROUND OF THE INVENTION

One of the services historically offered by financial institutions, such as banks, are treasury services. One purpose of the treasury services performed by banks is to aid its customers, typically corporations, in the management of the corporation's cash flows. One treasury service offered by banks is the taking of deposits. Deposits are a term used to describe the taking of currencies from customers for an indefinite period of time (e.g., call deposits) or for a fixed time period, typically from overnight up to one year. For example, if the corporation has closed on the sale of some assets (e.g., a parcel of real property) and the corporation has not yet allocated the proceeds from the sale, the corporation has a need to do something with the proceeds until it has decided on the final use of the proceeds. Typically, the corporation will execute a deposit of the proceeds with the bank for that period of time.

A deposit has several attributes including the currency, the term and the interest rate. The first attribute is the currency of the deposit. In the global economy of today, a bank can be expected to receive and maintain deposits in several different currencies. Currencies are currently divided into major currencies and minor currencies. Some examples of major currencies are United States Dollars (USD) and the Euro (EUR). Minor currencies include Canadian Dollars (CAD) and Hong Kong Dollars (HKD). The term, also known as the tenor, of the deposit typically ranges from an overnight deposit to a deposit for a period of a few days, weeks, months or years. The interest rate paid on the deposit is primarily a function of the market at the time the deposit is made and varies depending on the term of the deposit as well the amount and currency of the deposit.

In the traditional method of taking deposits, the customer telephones a member of the trading desk at the bank. The trader takes the details of the deposit (amount, currency, tenor) and determines the rate at which the bank will take the deposit. The trader then gives the customer a quote (makes a bid) that the customer then either accepts or declines. If the customer accepts the bid, the trader inputs the details into a trading system that generates a deal ticket representative of the terms and conditions of the transaction between the bank and the customer. A paper confirmation is then forwarded to the customer for confirmation of the deal with respect to the deposit. Typically, the paper confirmation is forwarded to the customer by mail, facsimile or by other manual means. The customer executes the confirmation and forwards the executed confirmation back to the bank. The paper confirmation acts as documentation of the contract between the bank and the customer regarding the deposit.

One significant drawback with the prior art method of deposit taking is that the customer is provided with little information regarding the variety of options available with respect to the attributes of the deposit. As described above, the customer describes the nature of the deposit to the trader over the telephone and the trader replies with a quote with respect to the described deposit. The customer is typically not given any further information with respect to alternatives with respect to the deposit, such as different currencies or different tenors.

A drawback to banks operating according to the traditional deposit taking method is that it requires a large number of personnel in the functions of traders, salespeople and support staff. A large number of traders and salespeople must always be on call in order to provide quotes over the telephone and to book deals with respect to deposits. The manual process of generating and obtaining executed confirmations with respect to deposits requires extensive procedures and the personnel to execute those procedures. If the personnel fail to properly execute those procedures, particular deals may be inaccurately executed and/or documented (requiring investigation of the deal), and more significantly, customers that are dissatisfied with the customer service of the bank may take their business elsewhere.

Another significant limitation with the current system and method for taking deposits is the manual confirmation process. As just described, the process of generating and forwarding the confirmation to the customer, as well as receiving the executed confirmation from the customer is manually intensive and can be error prone. Furthermore, it takes time for the bank to generate and forward the confirmation to the customer. Errors may be not be resolved for some length of time during which interest rates may have changed with a resulting adverse economic impact to either the bank or the customer.

SUMMARY OF THE INVENTION

In light of the above problems associated with the traditional system and method for taking deposits, the present invention provides an automated way in which information regarding deposit options is presented to the customer, the way in which the deals regarding deposits are formed and the manner in which the deals are executed and confirmed.

In a preferred embodiment, the system is operated by a financial institution such as a bank for the benefit of its customers. The system is embodied as a web site and the bank customers securely access the system through the Internet. The main screen of the online trading system displays to the customers the bank's current rates for a plurality of currencies and a plurality of time periods. The time periods for the deposits range from overnight to several months or even a year. In a preferred embodiment, this information is presented to the customer in the form of a rate chart in a window on the user's workstation. Once the customer has found a time period/rate/currency that is acceptable, the customer selects the desired rate on the customer interface. The response of the system to this selection depends on the nature of the rates being displayed to the customer.

The system displays deposit rates in two different modes, a Live Rate mode and an Indicative Rate mode. In the Live Rate mode, rates displayed to the customer are currently available, live rates. When in the Live Rate mode, the selection by the customer causes the system to automatically generate a deal ticket containing the customer selections. The customer can then accept or reject the information contained in the deal ticket. If the customer accepts the trade, the deposit is automatically executed by the system.

The Indicative Rate mode is employed in times when the market is volatile. In the Indicative Rate mode, after the customer submits his selections to the system, a trader at the bank evaluates the customer's selection of currency and tenor and generates a quote for a rate. The quote is then presented to the customer, who then has to acknowledge and accept the trade within a predetermined period of time. If the trade is accepted by the customer, the system automatically executes the accepted deposit request. If the trade is not acknowledged and accepted within the predetermined time period, the trade expires. As can be seen from the above description, an important aspect of the present invention is that the confirmation of the trade occurs online and real time. Once the customer accepts the trade, it is logged.

The system allows the customer to generate customized screens that display the bids (e.g., to display the types of currencies in which the customer is interested). The system has further utilities for the customers to view archives of previous deals, establish profiles and preferences and chat with traders. The system further includes state of the art security in order to ensure the safety and confidentiality of the banking transactions.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
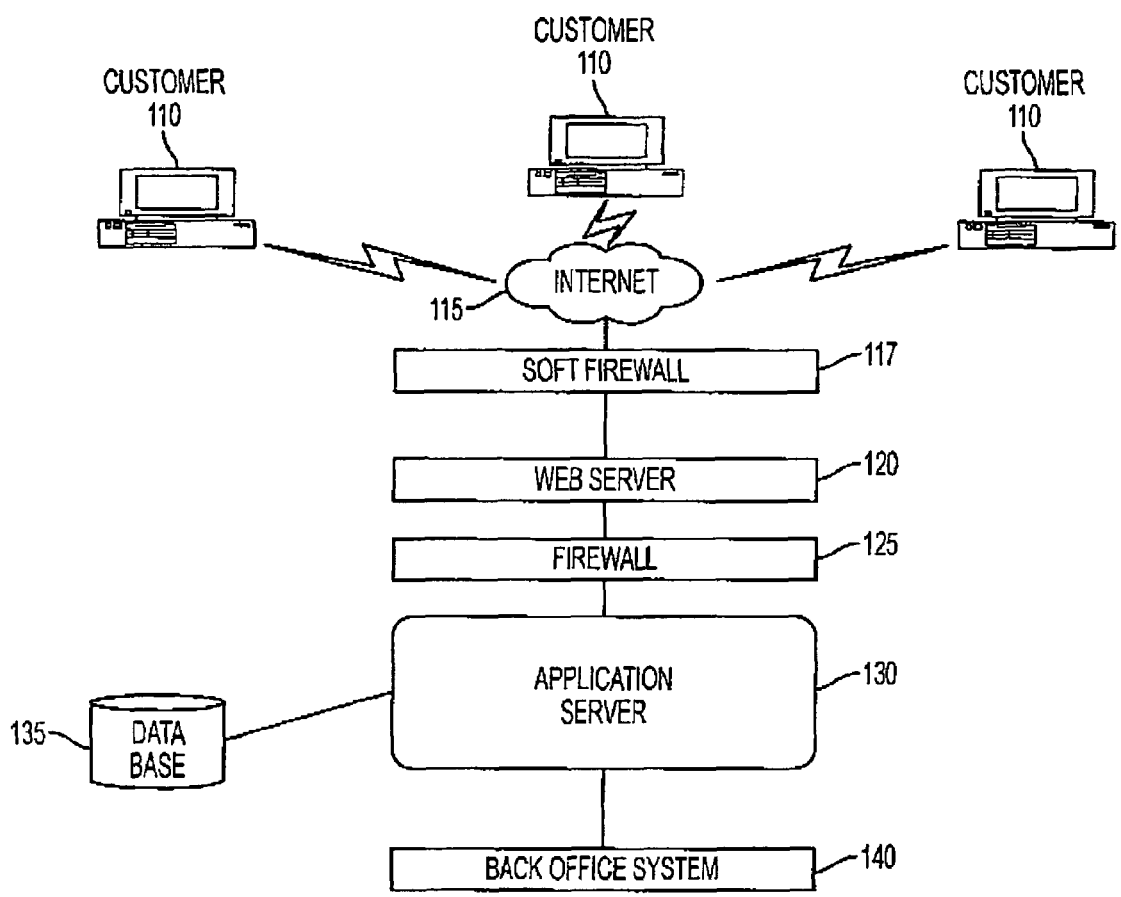
FIG. 1 illustrates the hardware components of the system of the present invention.

Referring now to the drawing figures in which like reference numbers refer to like elements, there is shown in FIG. 1 a diagram of the hardware elements of the system of the present invention, designated generally as "100".

System 100 illustrates the system of the present invention that allows customers 110 to use the Internet 115 to obtain real time and indicative quotes for deposits and for making such deposits. Customers 110 use their workstations 110 to connect to system 100 through a communication network 115. In a preferred embodiment, the network 115 is the public Internet, but can be any other communication connection such as a direct dial up line or a third party value added network. Customer workstations 110 are comprised of any platform capable of running an Internet web browser or similar graphical user interface software. Examples of suitable web browsers include Microsoft's Internet Explorer™ and Netscape's Communicator™. The platform for user workstations 110 can vary depending on the needs of its particular user and includes a desktop, laptop or handheld personal computer, personal digital assistant, web enabled cellular phone, web enabled television, or even a workstation coupled to a mainframe computer.

In the preferred embodiment, customer workstations 110 communicate with system 100 using the Transmission Control Protocol/Internet Protocol (TCP/IP) upon which particular subsets of that protocol can be used to facilitate communications. Examples include the Hypertext Transfer Protocol (HTTP), data carrying Hypertext Mark-Up Language (HTML) web pages, Java and Active-X applets and File Transfer Protocol (FTP). Data connections between customer workstations 110 and data communication network 115 can be any known arrangement for accessing a data communication network, such as dial-up Serial Line Interface Protocol/Point-to-Point Protocol (SLIP/PPP), Integrated Services Digital Network (ISDN), dedicated leased-line service, broadband (cable) access, Digital Subscriber Line (DSL), Asynchronous Transfer Mode (ATM), Frame Relay or other known access techniques. Web server 120 is coupled to data communication network 115 in a similar fashion. However, it is preferred that the link between the web server 120 and data communication network 115 be arranged such that access to the web server 120 is always available.

It should be noted that although customer workstations 110 and the web server 120 are shown as each coupled to a single data communication network 115, this arrangement is shown merely for the convenience of aiding explanation of the present invention and is not limited to such. For example, data communication network 115 can be the Internet or other public or private network comprised of multiple communication networks, coupled together by network switches or other communication elements. Between the communication network 115 and the web servers 120 of system 100 is a "soft" firewall 117. Soft firewall 117 is firewall that is erected using only software techniques (as opposed to firewall described below).

Web server 120 is comprised of one or more central processing units coupled to one or more databases (not shown). In addition, web server 120 further comprise a network interface (not shown) to couple the processor to data communication network 115, and include provisions for a web site or other technology which can create a network presence from which the provider of web server 120 can interact with customer workstations 110. Technologies including hardware and software for establishing web sites such as an Internet web site are known.

Web server 120 can be comprised of any suitable processor arrangement designed to accommodate the expected number of users and transactions for the particular system in which these elements will be implemented. Known software languages and database technologies can be used to implement the described processes. The databases and programmatic code used by web server 120 are stored in suitable storage devices within, or which have access to, web server 120. The nature of the invention is such that one skilled in the art of writing computer executable code (software), would be able to implement the described functions using one or more popular computer programming languages such as "C++", Visual Basic, Java or HTML.

The web server 120 is coupled, through a separate firewall 125, to application server 130. The firewall 125 is comprised of both hardware and software components as is well known in the art. Firewall 125 is required to protect the confidential information contained in system 100 illustrated below firewall 125 in FIG. 1. As implied by its title, the application server 130 is where the applications employed by the web servers 120 reside. Coupled to the application server 130 is a database 135. Aside from other data, the customer profiles containing the user IDs, passwords and relationship and profile data is stored in database 135. Although not shown, database 135 can include a suitable database management system processor which operates thereon. In addition, although database 135 is shown as a separate entity in FIG. 1, it is contemplated that database 135 can be implemented as part of a storage device within the application server 130, or can even be coupled to application server 130 across a communication link. Database 135 is preferably a multidimensional database that is analyzed using on-line analytical processing (OLAP) tools.

The application server 130 is further shown as coupled to the back office system 140. As will be further described below, the back office system 140 includes the legacy systems of the financial institution for taking and maintaining deposits. Although not specifically illustrated in FIG. 1, the back office system contains a number of internal databases and links to external systems. In one aspect of the present invention, these databases and links are used by the system of the present invention to obtain data related to the market for the currencies in which deposits are taken. This data is in turn used in making deposit quotes to customers.

Figure 2:
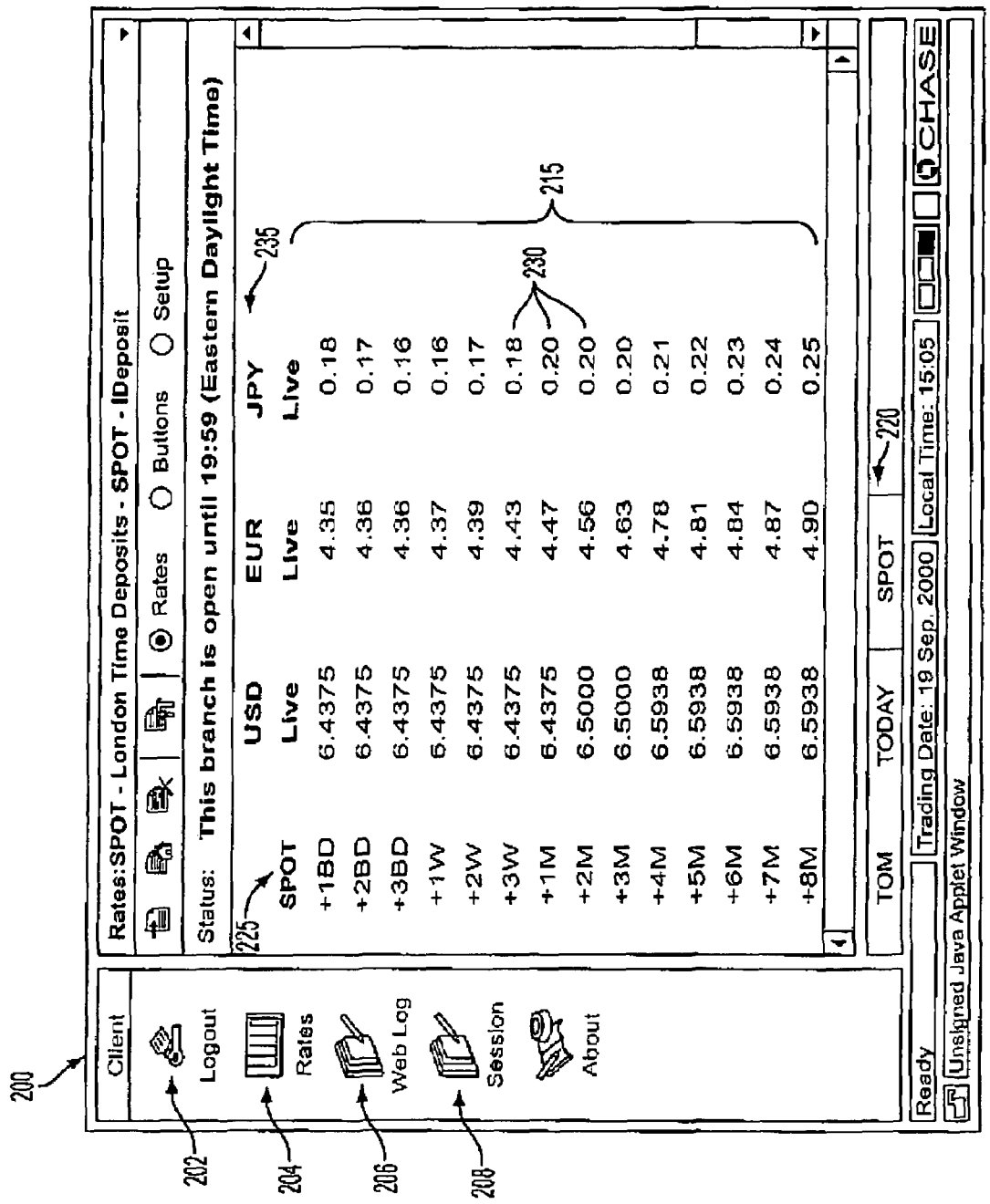
FIG. 2 depicts a user interface presenting live rates to a user.

FIG. 2 illustrates the main screen presented to customers by the web server (120 in FIG. 1) after they have logged onto the server 120. Along the left hand side of the screen appears the main menu 200 of the system. The main menu 200 contains a number of icons 202-208 that represent some of the primary functions available to the customers. "Logout" icon 202 is used by the customer to exit the system when they have completed their operations on the site. When the user first connects to the system, this icon 202 is a "Login" icon that allows the customer to input her user ID and password. As appreciated by those skilled in the art, the use of a user ID and password is one manner in which the security of the site is maintained. Other security measures such as encryption and authentication are used, but shall not be described herein.

Activation of the "Rates" icon 204 causes the system to display a rate table 215 in the main portion of the screen. The customer can define a default rate table to be displayed upon the user's activation of the "Rates" icon 204. As described further below in connection with FIG. 3, the user can thereafter generate, save and recall other customized rate tables.

The "Web Log" icon 206 allows the customer to view a list of all of the deposits transacted by the customer using the system of the present invention, i.e., an archive function. The archive function allows the customer to create a query of the deposit database in order to retrieve deposits meeting the customer's criteria. In a simple embodiment, the customer may request all deposits made between two specified dates Additionally, once the records reflecting the queried deposits have been retrieved by the system, the customer is able to generate and export a database spreadsheet file containing the records (e.g., an Excel™ spreadsheet). The spreadsheet file can thus be imported into the customer's systems for internal use by the customer.

Similar to function activated by the "Web Log" icon 206, the "Session" icon 208 allows the customer to view a list of all of the trades that the customer has executed since logging onto the system. In a preferred embodiment, the session log listing the deposits contains the following fields that are displayed to the customer: the date on which the trade was executed; the time of execution; the type of instrument; the amount of the deposit; the currency of the deposit; the rate; the return; the value date; and the maturity date.

The specific rate table 215 illustrated in FIG. 2, entitled "SPOT" was previously defined by the customer. As seen on the bottom portion of the main screen, this customer has further defined several other formats of rate tables known as setups 220. The format for the "SPOT" setup includes a plurality of different rates 230, for a plurality of different tenors 225 for a plurality of different currencies 235. The "SPOT" setup, as well as the other setups 220 were created by the customer using a setup function activated by the "New Setup" icon 240.

Figure 3:
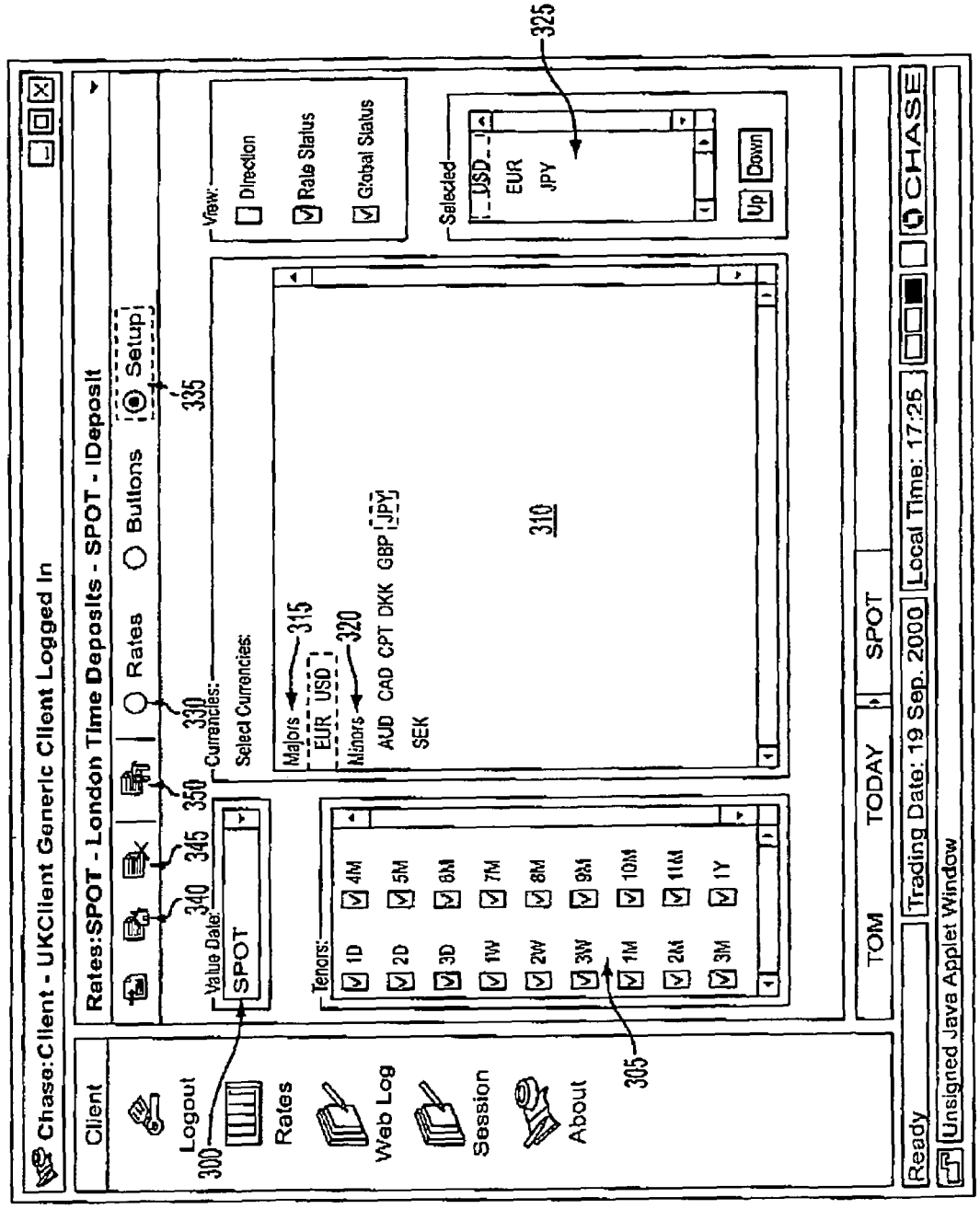
FIG. 3 is a user interface screen used for generating new rate screens.

Activation of the "New Setup" icon 240 brings up the setup screen illustrated in FIG. 3. Although, not shown in FIG. 3, the customer is first asked to name the new setup and to choose the instrument group from a list of groups which the customer is authorized to trade. For example, the customer might have only been authorized to make deposits through the London branch of the bank. Accordingly, this customer may develop new setups that include the rates, tenors and currencies offered by the London branch. The instruments that a customer may trade are stipulated in a previously negotiated agreement between the bank and the customer.

When creating a new setup, the customer first selects a value date 300. In a preferred embodiment, the value dates 300 selectable by the customer include Today, Tomorrow or Spot. These value dates 300 are displayed in a pull down menu for selection by the customer. The tenor panel 305 includes all of the tenors that the customer is authorized to trade. To select a tenor for display on the setup being created, the customer selects the check box next to the desired tenor. Conversely, if the customer desired to deselect a tenor, a subsequent click on the check box will exclude the tenor from the setup. As previously, described, the tenor is the term for which the deposit will be taken, e.g., for a day, two days, a week or a month.

In order to select a currency to be displayed in the setup, the customer merely clicks on the desired currency in the currency panel 310. Displayed in the currency panel are all the currencies for which the customer is authorized. These currencies are broken down into Major currencies 315 and Minor currencies 320. As a customer selects certain currencies, the selected currencies appear in the selected panel 325. To change the position in which a currency is displayed in the set up, the customer selects the currency in the selection panel 325 and uses the Up and Down buttons to move the currency up or down on the list.

To view the newly created setup, the customer clicks on the Rates check box 330. This action displays a rate table (see 215 in FIG. 2 for example) that is formatted as designed by the customer. If the customer desires to further modify the setup, she clicks on the Setup check box 335 which returns the customer to the setup screen as illustrated in FIG. 3. Similarly, if the customer is viewing a previously created setup, she can click on the Setup check box 335 to modify the existing setup. Again, this action will bring up the setup screen of FIG. 3 which allows the customer to modify the format of the existing setup.

When a particular setup is being displayed, the customer can click on the Default icon 340 to set the currently displayed setup as the default setup. The default setup is displayed when the customer first logs onto the system. The Delete icon 345 is used to delete the currently selected (displayed) setup. The Deal Setting icon 350 is used by the customer to customize the display to preferences preferred by the customer. For example, the customer can choose to automatically hide deal tickets when making a trade, automatically size the frame, automatically close deal tickets, present the currency on the display buttons and split the screen horizontally or vertically.

Figure 4:
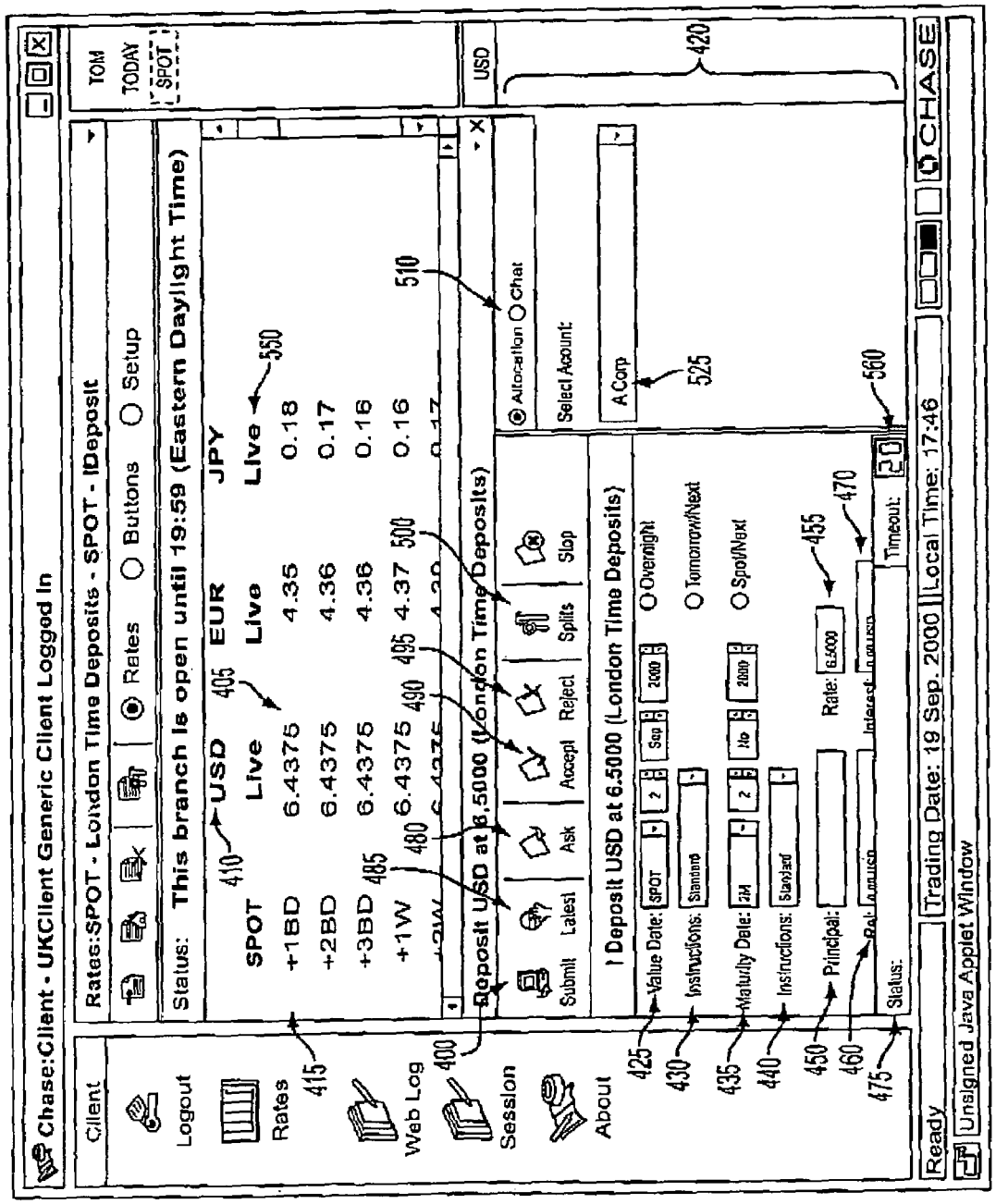
FIG. 4 illustrated a user interface screen containing a rate ticket.

FIG. 4 illustrates the manner in which a customer can make deposits (trades). There are two types of trade modes according to the present invention, Live Rate mode and Indicative Rate mode. The normal trading mode is the Live Rate mode. In the Live Rate mode, the customer can deal on the active and current rates displayed. As further described below, when the customer hits the Submit button 400, to send a deposit before the rate changes, the request for the deposit is automatically executed at that rate if the amount of the deposit is within the authorized maximum and minimum for that customer. In the Indicative Rate mode, the rates displayed to the customer are informational only. The Indicative Rate mode is used by the bank in times of market volatility when they cannot guarantee a particular rate. As further described below, the customer can still execute trades using the present invention, but must first receive an online quote from a trader at the bank.

In the example illustrated in FIG. 4, the customer has selected a particular currency 410 for a particular tenor 415. This selection is made by clicking on the rate 405 where the desired currency 410 and tenor 415 intersect. In this particular example, the customer has selected the currency as U.S. Dollars at a tenor of one business day which is offered by the bank at a rate 405 of 6.4375. Once the customer has selected this rate 405, the system automatically displays the deal ticket 420.

The deal ticket 420 is automatically filled out using certain information derived from the customer's selection. The Rate field 455 is automatically filled out by the system in response to the customer's selection of a interest rate. The date for the Value Date 425 is taken from the rates display selection by the customer. In this particular example, the Value Date 425 is Spot and the actual calendar date is displayed in this field 425. The Instructions field 430 defaults to the standard instructions that the customer has agreed to with respect to the taking of the deposit. Alternative settlement instructions can be established between the customer and the bank, and these alternative instructions are selectable through the drop down menu associated with the Instructions field 430. The Maturity Date field 435 is automatically calculated and displayed in response to the value date and tenor previously selected by the customer. The Instructions field 440 defaults to the standard instructions that the customer has agreed to with respect to the maturity of the deposit. Alternative maturity instructions can be established between the customer and the bank, and these alternative maturity instructions are selectable through the drop down menu associated with the Instructions field 440. In a further embodiment, changes to both the settlement instructions or maturity instructions can be made "on the fly". In this alternative embodiment, once the Value Date 425, Maturity Date 430 and Instruction 430, 440 fields have been automatically filled out, they can be modified by the customer. Each modification will most likely change the values in the other fields. For example, if the customer changes the Maturity Date 430 from one week to one month, the Rate 455 will most likely change. When the customer makes changes, the system performs integrity checks to ensure that the data is consistent. For example, if the customer changes the Value date 425 to Tomorrow, then the system does not allow a Maturity Date 430 of Tomorrow and requires the customer to change at least one of the selections.

In addition to the fields on the deal ticket automatically filled out by the system, the customer must manually fill out certain fields. The first of these fields is the account 525 to which the trade should apply. The drop down menu associated with the Account field 525 allows the customer to select a different account. Furthermore, by activating the Split button 500, the customer is permitted to designate several accounts to which the deal will apply. When splitting a deposit among more than one account, the customer must designate the amount of the deposit that is to be allocated to each account. The total amount of the deposit is automatically calculated and displayed in the Principal field 450. With the Principal field 450 filled in, the system automatically calculates the Principal and Interest 460 and the Interest 470.

In one embodiment of the present invention, the Rate 455 in the Deal Ticket 420 is not automatically updated by the system. Therefore, if the deal ticket 420 has been displayed for a long period of time, the rate displayed in Rate Field 455 is possibly not the rate currently being offered by the bank. In order to insert the latest rate into the Rate field 455, the customer may select Latest button 485. One reason for requiring the customer to update this field to prevent a customer from holding open a favorable interest rate on the chance that the interest rate will go down during the course of the day. Once the customer has completed all the required fields and is satisfied with the deal, the customer clicks on the Submit button 400 in order to send the deposit request to the bank. The system will first prompt the user to verify that she wishes to submit the deal for execution. Assuming the customer confirms that she desires to submit the deal, it is then processed to ensure that the deal is within all of the parameters set up between the customer and the bank. One of the checks performed on the data contained in the deal ticket 420 is to ensure that the rate has not changed since the deal ticket 420 was filled out. If the deal is in conformance with the standard parameters previously agreed to by the customer and the bank, the system then prompts the customer to confirm the deal by clicking on the Accept button 490. Once the customer as confirmed the acceptance of the deal, the deposit request is sent to the back office of the bank where it is booked. Once booked, the status line 475 is updated to indicate "Deal logged" which means that the deposit request has been executed by the bank.

If the deal is outside of the customer's parameters, if the rate has changed or if there are special instructions, the deal submitted by the customer is sent to a trader at the bank for verification and pricing. Once the trader has updated the deal ticket (e.g., with the current rate) the system redisplays the deal ticket 420 with the corrected data (e.g., a new rate in Rate field 455). The system will furthermore display a message in the Status area 475 requesting that the customer acknowledge the new deal (e.g., the new rate). To acknowledge the new deal the customer simply clicks on the Acknowledge button 480. The customer is then required to click on either the Accept 490 or Reject 495 buttons to respectively accept or reject the new deal.

If the problem cannot be resolved by the trader at the bank without talking to the customer, the trader can communicate directly with the customer using the Chat feature 510. This feature allows the customer and the trader to interactively communicate in a chat window (not shown). The customer can initiate a communication with a trader by selecting the Chat box 510. In this communication window (not shown) the customer can ask questions of the trader and the trader is be able to provide answers directly to the customer.

The previous discussion has detailed the Live Rate mode in Indicative Rate mode will now be discussed. As previously described, the Indicative Rate mode is employed in times of market volatility when the bank is unable to present live rate quotes to its customers in the above described rate table. When operating in the Indicative Rate mode, the system will present rates to the customer that are indicative of the rates that the customer can expect to be quoted by the bank. The rate is informational only, and does not represent a commitment by the bank to accept a deposit at that rate. As seen in FIG. 4, the system indicates that it is presenting live or indicative rates in area 550 of the rate table. If the rates are live rates, area 550 will include a "Live" indication, if the rates are indicative, area 550 will say "Indic." The same setups, as previously described with respect to FIG. 3, are used for both Live and Indicative Rate modes.

In the Indicative Rate mode, the customer selects a rate as described above and the system present a deal ticket 420 to the customer. The customer fills out the principle amount 450 and changes any other fields on the deal ticket 420 as describe above. When the customer is satisfied with the terms of the deposit request, she clicks on the Submit button 400 and the request for the deposit is forwarded to a trader at the bank. As previously described the deposit request includes the value date 425, the tenor 415 and the currency 410. The trader evaluates the value date 425, the tenor 415 and the currency 410 as requested by the customer and develops a rate to bid to the customer.

The trader at the bank presents the bid to the customer through the deal ticket 420. When the deal ticket 420 is updated with the bid, a message is displayed in the status area 475 that reads "ACKNOWLEDGE NEW RATE." The customer must acknowledge the bid using the Acknowledge button 485. Once the customer has acknowledged the bid, a time appears in the Timeout area 560. The time presented in this area 560 is the time left that the customer has to accept the bid. In a preferred embodiment, the time is measured in seconds. The time decrements until either the customer accepts or rejects the bid, or time runs out, in which case the bid from the bank expires. If the time in Timeout area 560 reaches zero before the customer has accepted the bid, the status area 475 is updated to read "PRICE WITHDRAWN" but the deal ticket 420 is not closed. In a preferred embodiment, the timeout begins when the customer acknowledges the deal.

The customer can expressly reject the bid by activating the Reject button 495. If the customer has any questions about the bid, the customer can initiate communication with the trader using the Chat feature 510 as previously described. If a chat takes place, the bid will most likely expire (timeout) and the customer will have to submit a new deposit request to which the trader will respond with another bid.

If the customer is satisfied with the bid, and the time in Timeout area 560 has not expired, the customer can accept the bid by selecting the Accept button 490. The accepted bid is transmitted to the back office of the bank where it is booked. Again, the acceptance by the customer of the deal acts as confirmation of the deal. The status line 475 is updated to indicate "Deal logged" which means that the deposit request has been executed by the bank.

As described above, the method and system of the present invention provides customers with complete information regarding deposit rates and options in an efficient and convenient manner right on the customer's desktop. The invention further allows the customer to automatically execute trades with respect to deposits without the need for interacting with bank traders and without the time consuming and error prone confirmation process of the prior art. The invention thus provides a valuable tool for liquidity management.

The invention enables customers to view the bank's current deposit rates and place deposits simply clicking on the Graphical User Interface (GUI) of the present invention. The deposits can be negotiated in any currency for which the customer has standing settlement instructions with the bank. In the Live Rate mode, the customer can view and place deposits without any interaction with bank personnel. In the Indicative Rate mode, the bank trader presents a bid to the customer's desktop that will be automatically processed once acknowledged and accepted by the customer. The customers, if so desired, can communicate with the bank traders using the chat feature of the present invention. The customers can furthermore display, sort and export a list of the all of the deposit transactions made using the present invention.

As appreciated by those skilled in the art, the present system can be integrated with other systems maintained by a financial institution or bank to provide seamless service to its customers. For example, the system can be coupled to the bank's foreign exchange system such that the customer can have it's deposits converted into a different currency before the deposit is taken. Similarly, the deposit taking system of the present invention can be coupled to the payment system of the bank such that the proceeds from the receipt of a payment are fed directly into the deposit taking system. Conversely, a payment can be made though the bank's payment system using funds that are maturing from a deposit taken by the system of the present invention.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method of conducting banking deposit transactions between a bank and its customers, the method comprising:
   providing a computer enabled interface to a public network to which customers of a bank have access;
   transmitting deposit terms over the public network to a customer, the deposit terms including value dates, currencies, tenors, settlement instructions and rates at which the bank will execute a deposit:
   receiving a deposit request generated by the customer that is transmitted by the customer to the bank over the public network, the deposit request including a specific value date, specific currency, specific tenor, specific rate, settlement instructions and a principle amount of a deposit;
   determining whether the specific rate specified in the received generated deposit request is a live rate or an indicative rate, and
   transmitting a modified deposit request comprising a modified rate over the public network to the customer if the specific rate in the received generated deposit request is an indicative rate,
   wherein the received generated deposit request is automatically executed if the specific rate in the generated deposit request is a live rate;
   wherein further the modified deposit request is automatically executed if the customer accepts the modified deposit request in a predetermined period of time,
   wherein further the principle amount of the deposit specified in the executed received generated deposit request or modified deposit request is deposited by the bank into an account of the customer, and wherein funds are transferred to the bank from or on behalf of the customer to settle the deposit according to the settlement instructions.

2. The method as recited in claim 1, wherein the computer enabled interface is a secure interface.

3. The method as recited in claim 1, wherein transmitting the deposit terms further comprises transmitting the deposit terms in a rate table.

4. The method as recited in claim 3, wherein one axis of the rate table are currencies and the other axis are tenors, the rate table being populated with the rates corresponding to the currencies and tenors.

5. The method as recited in claim 4, wherein generating a deposit request comprises selecting by the customer the specific rate from the rate table, wherein the specific value date, the specific currency and the specific tenor are automatically generated from the rate table in response to the specific rate selected by the customer.

6. The method as recited in claim 3, further comprising creating a customized rate table by the customer.

7. The method as recited in claim 6, wherein creating a customized rate table further comprises selecting one or more of a plurality of currencies for display on the customized rate table.

8. The method as recited in claim 7, wherein the plurality of currencies include major currencies and minor currencies.

9. The method as recited in claim 6, wherein creating a customized rate table further comprises selecting a customized value date for display on the customized rate table, the customized value date being selected from a plurality of value dates.

10. The method as recited in claim 9, wherein the plurality of value dates include today, tomorrow and spot.

11. The method as recited in claim 6, wherein creating a customized rate table further comprises allowing the customer to select one or more of a plurality of tenors for display on the customized rate table.

12. The method as recited in claim 11, wherein the plurality of tenors range from overnight one year.

13. The method as recited in claim 1, further comprising displaying an archive of all executed deposit requests.

14. The method as recited in claim 1, wherein a session is the time period starting when the customer logs onto the computer enabled interface and ending when the customer logs off of the computer enabled interface, the method further comprising displaying an archive of all deposit requests executed by the customer during the session.

15. The method as recited in claim 1, wherein the deposit request comprises a deal ticket, the deal ticket having fields containing data representing the specific value date, specific currency, specific tenor and specific rate.

16. The method as recited in claim 15, further the data in the fields of the deal ticket are modified by the customer.

17. The method as recited in claim 15, wherein the deal ticket further has fields containing data representing a principle amount of the deposit.

18. The method as recited in claim 17, wherein the customer supplies the data representing the principle amount of the deposit.

19. The method as recited in claim 15, wherein the deal ticket further has fields containing data representing at least one customer account associated with the deposit.

20. The method as recited in claim 19, wherein the customer supplies the data representing the at least one customer account associated with the deposit.

21. The method as recited in claim 19, wherein the customer supplies the data representing a plurality of customer accounts associated with the deposit.

22. The method as recited in claim 1, further comprising acknowledgement of the modified deposit request by the customer.

23. The method as recited in claim 1, further comprising the customer communicating with an employee of the bank through the computer enabled interface.

24. A system for conducting banking deposit transactions between a bank and its customers, the system comprising:
an interface to a public network to which customers of a bank have access;
a server coupled to the interface, the server configured so as to:
transmit deposit terms over the public network to a customer, the deposit terms including value dates, currencies, tenors, settlement instructions and rates at which the bank will execute a deposit,
receive a deposit request generated by the customer that is transmitted by the customer to the server over the public network, the deposit request including a specific value date, specific currency, specific tenor, specific rate, settlement instructions and a principle amount of a deposit, and
determine whether the specific rate specified in the received generated deposit request is a live rate or an indicative rate, and
transmit a modified deposit request comprising a modified rate over the public network to the customer if the specific rate in the generated deposit request is an indicative rate, and
wherein the back office deposit processing system is configured to automatically execute the received generated deposit request if the specific rate in the generated deposit request is a live rate,
wherein further the back office deposit processing system is configured to automatically execute the modified deposit request if the customer accepts the modified deposit request in a predetermined period of time,
wherein further the principle amount of the deposit specified in the executed received generated deposit request or modified deposit request is deposited by the bank into an account of the customer, and
wherein funds are transferred to the bank from or on behalf of the customer to settle the deposit according to the settlement instructions.

25. The system as recited in claim 24, wherein the the deposit terms are transmitted in a rate table.

26. The system as recited in claim 24, wherein one axis of the rate table are currencies and the other axis are tenors, the rate table being populated by the server with the rates corresponding to the currencies and tenors.

27. The system as recited in claim 26, wherein the customer selects the specific rate from the rate table, wherein the server automatically generates the specific value date, the specific currency and the specific tenor from the rate table in response to the specific rate selected by the customer.

28. The system as recited in claim 25, further comprising a customization database coupled to the server, wherein customer creates a customized rate table and wherein the customized rate table is stored in the customization database.

29. The system as recited in claim 28, wherein the customer selects one or more of a plurality of currencies for display on the customized rate table.

30. The system as recited in claim 29, wherein the plurality of currencies include major currencies and minor currencies.

31. The system as recited in claim 28, wherein the customer selects a customized value date for the customized rate table, the customized value date being selected from a plurality of value dates.

32. The system as recited in claim 31, wherein the plurality of value dates include today, tomorrow and spot.

33. The system as recited in claim 28, wherein the customer selects one or more of a plurality of tenors for display on the customized rate table.

34. The system as recited in claim 33, wherein the plurality of tenors range from overnight to one year or longer.

35. The system as recited in claim 24, wherein the deposit request comprises a deal ticket, the deal ticket having fields containing data representing the specific value date, specific currency, specific tenor and specific rate.

36. The system as recited in claim 35, wherein the customer modifies the data in the fields of the deal ticket.

37. The system as recited in claim 35, wherein the deal ticket further has fields containing data representing a principle amount of the deposit.

38. The system as recited in claim 37, wherein the customer supplies the data representing the principle amount of the deposit.

39. The system as recited in claim 35, wherein the deal ticket further has fields containing data representing at least one customer account associated with the deposit.

40. The system as recited in claim 39, wherein the customer supplies the data representing the at least one customer account associated with the deposit.

41. The system as recited in claim 39, wherein the customer supplies the data representing a plurality of customer accounts associated with the deposit.

42. The system as recited in claim 24, wherein the customer acknowledges the modified deposit request.

43. The system as recited in claim 24, wherein the customer communicates with an employee of the bank through the computer enabled interface.

44. The method of claim 1, wherein the settlement instructions comprise standard default instructions established between the bank and the customer.

45. The method of claim 44, wherein the settlement instructions are modified by the customer when selecting the deposit terms.

46. The method of claim 1, wherein the settlement instructions comprise alternative instructions, wherein further the customer selects one of the alternative settlement instructions.

47. The method of claim 46, wherein the settlement instructions are modified by the customer when selecting the deposit terms.

48. The system of claim 24, wherein the settlement instructions comprise standard default instructions established between the bank and the customer.

49. The system of claim 48, wherein the settlement instructions are modified by the customer when selecting the deposit terms.

50. The system of claim 24, wherein the settlement instructions comprise alternative instructions, wherein further the customer selects one of the alternative settlement instructions.

51. The system of claim 50, wherein the settlement instructions are modified by the customer when selecting the deposit terms.

* * * * *